(12) United States Patent
Kirihara et al.

(10) Patent No.: US 7,753,752 B2
(45) Date of Patent: Jul. 13, 2010

(54) PLASMA DISPLAY PANEL CUTTING METHOD

(75) Inventors: Nobuyuki Kirihara, Osaka (JP); Hiroki Nunose, Nara (JP); Masayoshi Koyama, Osaka (JP); Akira Isomi, Osaka (JP)

(73) Assignee: Panasonic Corporation, Osaka (JP)

( * ) Notice: Subject to any disclaimer, the term of this patent is extended or adjusted under 35 U.S.C. 154(b) by 504 days.

(21) Appl. No.: 11/719,717

(22) PCT Filed: Jan. 17, 2006

(86) PCT No.: PCT/JP2006/300467

§ 371 (c)(1),
(2), (4) Date: May 18, 2007

(87) PCT Pub. No.: WO2006/075749

PCT Pub. Date: Jul. 20, 2006

(65) Prior Publication Data

US 2009/0156081 A1    Jun. 18, 2009

(30) Foreign Application Priority Data

Jan. 17, 2005  (JP) ............................. 2005-008779
May 17, 2005  (JP) ............................. 2005-143743

(51) Int. Cl.
  *H01J 9/50* (2006.01)
  *B26D 3/00* (2006.01)
  *B26D 3/08* (2006.01)
(52) U.S. Cl. .................. 445/24; 445/25; 225/96.5; 83/51; 83/885; 83/881; 83/880
(58) Field of Classification Search .................. 445/24, 445/25; 225/96.5; 83/885, 51, 881, 880
See application file for complete search history.

(56) References Cited

U.S. PATENT DOCUMENTS

| 6,632,113 | B1 * | 10/2003 | Noma et al. .................. 445/2 |
| 7,131,562 | B2 | 11/2006 | Ueyama et al. |
| 2004/0040997 | A1 * | 3/2004 | Ueyama et al. ............. 225/96.5 |
| 2004/0074366 | A1 * | 4/2004 | Choo et al. .................. 83/886 |

FOREIGN PATENT DOCUMENTS

| CN | 1486285 A | | 3/2004 |
| CN | 1564301 A | | 1/2005 |
| JP | 04262339 A | * | 9/1992 |
| JP | 2004-168584 A | | 6/2004 |
| JP | 2004-196635 A | | 7/2004 |
| JP | 2004196635 A | * | 7/2004 |
| JP | 2004305900 A | * | 11/2004 |
| WO | WO 02/057192 A1 | | 7/2002 |

OTHER PUBLICATIONS

International Search Report for PCT/JP2006/300467, dated Apr. 18, 2006.

* cited by examiner

*Primary Examiner*—Mariceli Santiago
(74) *Attorney, Agent, or Firm*—RatnerPrestia

(57) ABSTRACT

In a method of cutting a plasma display panel, a front glass substrate and a rear glass substrate are sealed so as to face each other. The front glass substrate and the rear glass substrate are sandwiched between pairs of rotating cutters, and the pairs of rotating cutters are pressed onto the front glass substrate and the rear glass substrate to be in contact therewith so that the rotating cutters are run thereon in order to cut the substrates.

7 Claims, 8 Drawing Sheets

PLASMA DISPLAY PANEL CUTTING METHOD

This application is a U.S. National Phase Application of PCT International Application PCT/JP2006/300467.

TECHNICAL FIELD

The present invention relates to a method of dividing a front glass substrate and a rear glass substrate in a plasma display panel recycling step, more particularly to a method of and an apparatus for improving a level of efficiency in a plasma display panel dissembling process.

BACKGROUND ART

In recent years, it has become an important issue to recycle a product in response to growing public awareness of environmental protection and resource utilization. In a plasma display panel (hereinafter, referred to as PDP), how glass substrates, which are main components thereof, can be recycled is a major issue. There is provided a sealing member using a metal material whose reproduction is difficult in peripheral parts of the glass substrates. It is necessary to carve out the sealing member having a frame shape and central parts of the glass substrates in the process where the glass substrate is recycled.

In the PDP, a front glass substrate having a thickness of approximately 3 mm in which electrodes and the like are formed and a rear glass substrate having a thickness of approximately 3 mm in which barrier ribs, phosphors and the like are formed are placed so as to face each other so that a discharge space is formed inside, and peripheral parts thereof are sealed with a sealing member. The front glass substrate and the rear glass substrate have different sizes. At end parts of the glass substrates, the front glass substrate and the rear glass substrate are not overlapped with each other, and electrode terminals for connecting electrodes to an electronic circuit are provided. Thus, the glass substrates of the PDP include the glass-substrate sealed parts to which the sealing member is adhered, the glass-substrate central parts to which the sealing member is not adhered, and the glass-substrate end parts at which the front glass substrate and the rear glass substrate are not overlapped with each other.

As the sealing member used in the sealing, low-melting glass including a lead component by a relatively high percentage is used due to restriction for a sealing temperature. Accordingly, it is difficult to recycle the glass-substrate sealed parts to which the sealing member is adhered, while it is possible to recycle the glass substrates at the glass-substrate central parts because the sealing member is not adhered thereto. Therefore, it is necessary to segregate the glass-substrate sealed parts and the glass-substrate central parts from each other in the recycling step.

A conventional method of cutting the two glass substrates having the mentioned thickness is to scribe surfaces of the two substrates using a diamond cutter and apply a shearing force thereto along the scribe.

A method of cutting a glass substrate by scribing, which is publicly disclosed, is to etch or apply a chemical process such as chemical polishing to a part or all of a rear surface of the glass substrate, and thereafter form such a scribe that generates a crack reaching the rear surface of the glass substrate so that the glass substrate can be divided. The dividing method of this type is disclosed in the Japanese Patent Unexamined Publication No. 2004-168584.

However, the foregoing conventional method is disadvantageous in that, for example, it is time-consuming to separate the front glass substrate and the rear glass substrate from each other.

Further, in a method in which the etching is applied in advance to a surface opposite to the surface in which the scribe is formed when a glass substrate is cut, it is additionally necessary to etch the glass substrate in advance when the PDP is manufactured, which resulted in cost increase.

DISCLOSURE OF THE INVENTION

A method of cutting a plasma display panel according to the present invention is a method of cutting a plasma display panel wherein a front glass substrate and a rear glass substrate are overlapped with each other and sealed with a sealing member. The cutting method is characterized in that the front glass substrate and the rear glass substrate are sandwiched between a pair of glass cutting members, and the front glass substrate and the rear glass substrate are cut in such a manner that the pair of glass cutting members is pressed and run with respect to the front glass substrate and the rear glass substrate.

According to the method, PDP including two glass substrates can be efficiently cut, and washing and sludge treatments become unnecessary because the substrates are cut by means of the dry process. As a result, facility costs can be largely reduced.

Further, an apparatus for cutting a plasma display panel according to the present invention is adapted as follows.

The apparatus includes a glass cutting member provided so as to sandwich a front glass substrate and a rear glass substrate of the plasma display panel, a glass cutting member pressing device for pressing the glass cutting member to the front glass substrate and the rear glass substrate so that it contacts the substrates, and a glass cutting member running device for making the glass cutting member run along the front glass substrate and the rear glass substrate.

According to the apparatus discussed above, the PDP including the two glass substrates can be efficiently cut, and the washing and sludge treatments become unnecessary because the substrates are cut by means of the dry process. As a result, the facility costs can be largely reduced.

Figure 1A:
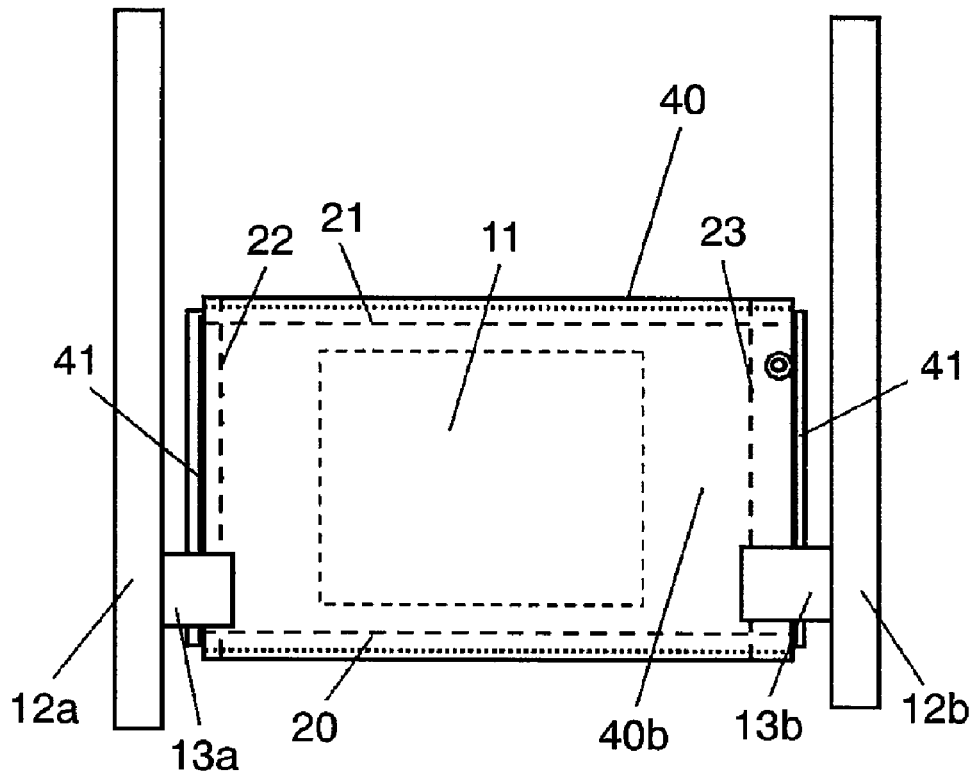
FIG. 1A is a plan view illustrating a PDP cutting apparatus according to a first preferred embodiment of the present invention.

DESCRIPTION OF REFERENCE MARKS 11 substrate table (table)
12a, 12b glass cutting member running device (slider)
13a, 13b glass cutting member retaining section
15a, 15b, 15c 15d glass cutting member pressing device (air-pressure cylinder)
16a, 16b, 16c, 16d glass cutting member (rotating cutter)
17a, 17b cutting blade
18a, 18b cutting blade retaining section
19a, 19b supporting member
20, 21, 22, 23 line
25 fluid injecting device (air-pressure pump)
26 fluid injecting tube (tube)
31a, 31b, 31c, 31d scribing scar
32a, 32b, 32c, 32d scribing scar
40 plasma display panel (PDP)
40a glass-substrate sealed part
40b glass-substrate central part
40c glass-substrate end part
41 sealing member
50 front glass substrate
51 glass plate
52 transparent electrode
53 bus electrode
54 black stripe
55 dielectric layer
56 MgO dielectric protective layer
60 rear glass substrate
61 barrier rib
62 exhaust pipe
63 glass plate
64 address electrode
65 ground dielectric layer
66 phosphoric layer
67 discharging space

PREFERRED EMBODIMENTS FOR CARRYING OUT THE INVENTION

Figure 8A:
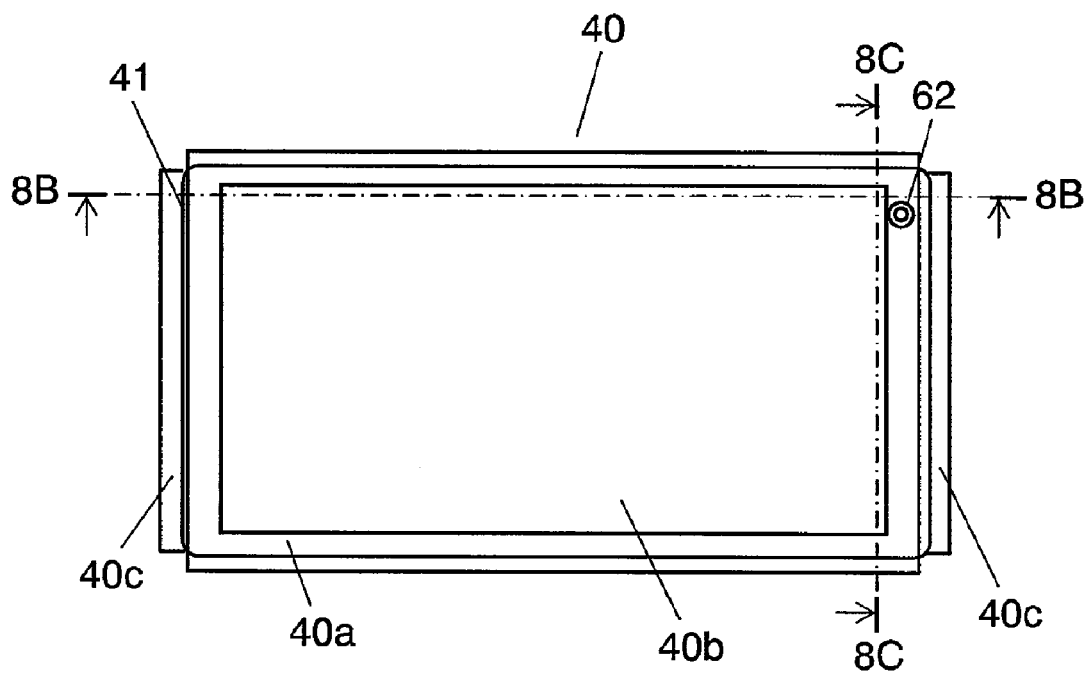
FIG. 8A is a plan view illustrating a schematic structure of the PDP.
Figure 8B:
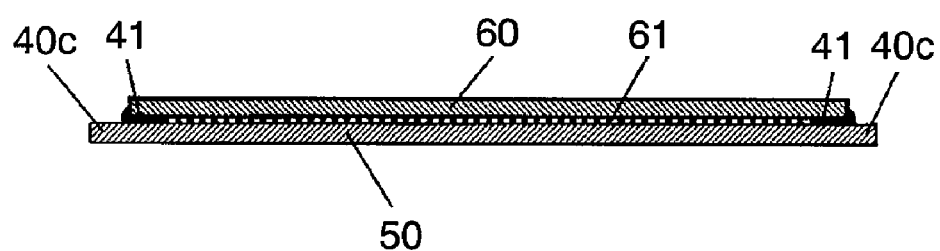
FIG. 8B is a sectional view cut along 8B-8B line shown in FIG. 8A.
Figure 8C:
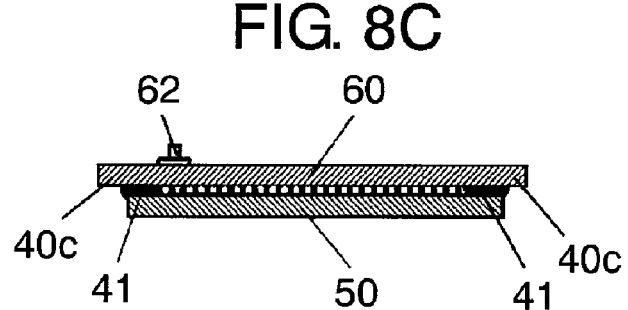
FIG. 8C is a sectional view cut along 8C-8C line shown in FIG. 8A.

First, PDP, which is an object of preferred embodiments of the present invention, is described referring to the drawings. FIG. 8A is a plan view illustrating a schematic structure of the PDP. FIG. 8B is a sectional view cut along 8B-8B line shown in FIG. 8A. FIG. 8C is a sectional view cut along 8C-8C line shown in FIG. 8A.

In FIGS. 8A through 8C, PDP 40 includes rectangular front glass substrate 50 and rear glass substrate 60 having different sizes overlapped with each other, wherein peripheral parts of the substrates are sealed in a frame shape with sealing member 41. On an inner surface of front glass substrate 50 are formed electrodes and the like (not shown). On an inner surface of rear glass substrate 60 are formed barrier ribs 61, electrodes and the like, which constitutes a discharging space (not shown). At a corner of rear glass substrate 60 is provided exhaust pipe 62 for exhausting air from the discharging space and sealing discharge gas thereinto. Exhaust pipe 62 is sealed after the discharge gas is sealed into the discharging space.

As shown in FIG. 8B, a horizontal length of front glass substrate 50 is longer than that of rear glass substrate 60. As shown in FIG. 8C, a vertical length of rear glass substrate 60 is longer than that of front glass substrate 50. Therefore, respective glass-substrates end parts 40c are adapted in such a manner that front glass substrate 50 and rear glass substrate 60 are not overlapped with each other. Glass-substrate end parts 40c are provided with electrode terminals (not shown) for connecting the electrodes to an electronic circuit. Therefore, the glass substrates of PDP 40 include glass-substrate sealed parts 40a having the frame shape where sealing member 41 is formed, glass-substrate central parts 40b where sealing member 41 is not formed, and glass-substrate end parts 40c where front glass substrate 50 and rear glass substrate 60 are not overlapped with each other.

Figure 9:
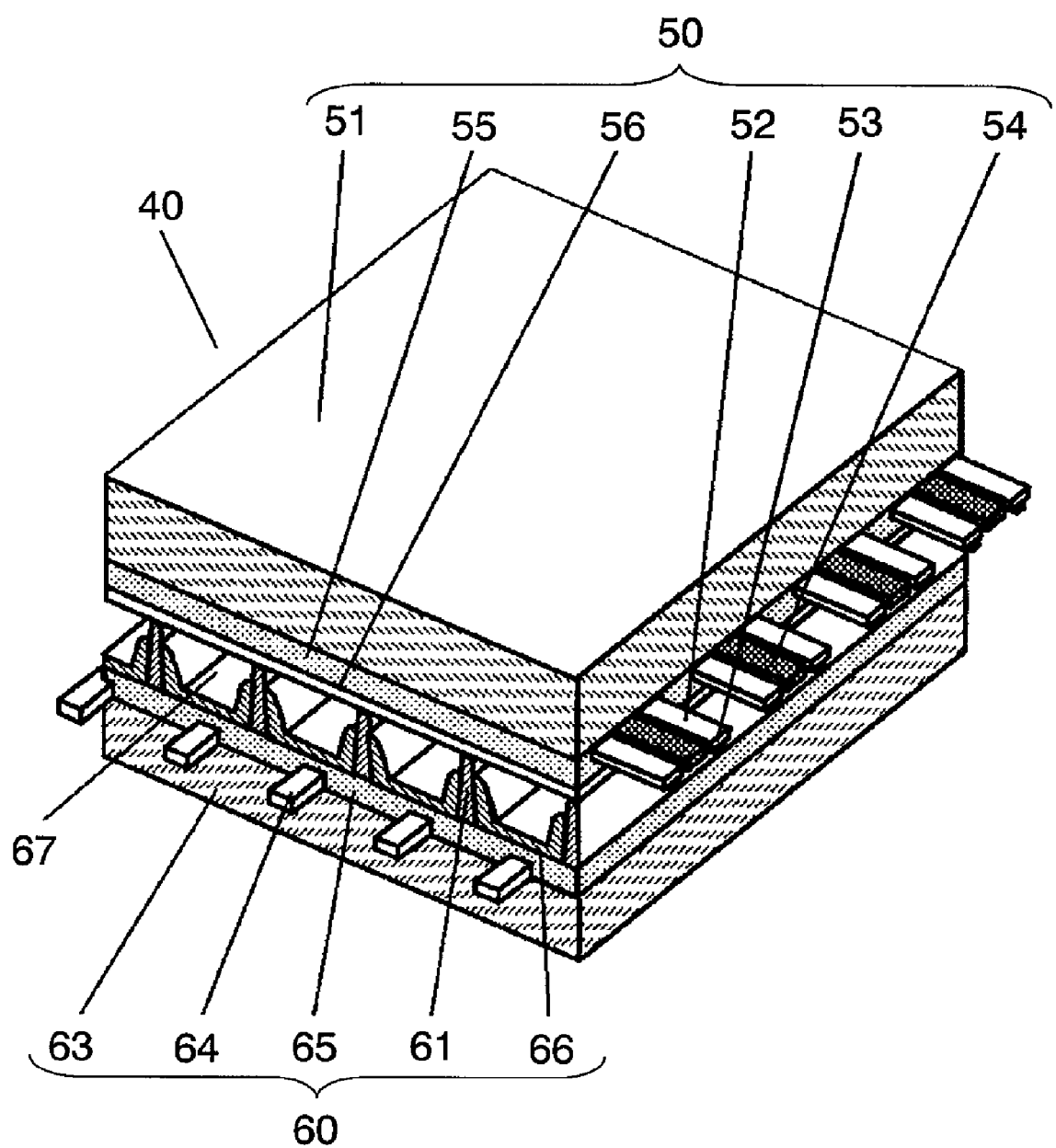
FIG. 9 is an illustration of a partial internal structure of the PDP shown in a sectional and perspective view.

FIG. 9 is an illustration of a partial internal structure of PDP 40 shown in a sectional and perspective view. PDP 40 includes front glass substrate 50 and rear glass substrate 60 placed so as to face each other. In front glass substrate 50, transparent electrodes 52, bus electrodes 53, black stripes 54, dielectric layer 55, and MgO dielectric protective layer 56 are formed on glass plate 51.

In rear glass substrate 60, address electrodes 64 and ground dielectric layer 65 are formed on glass plate 63, barrier ribs 61 are further formed thereon, and phosphoric layers 66 are formed between barrier ribs 61. Discharge gas, which is mixed gas such as Ne (neon)-Xe (xenon), is sealed into discharging space 67 between front glass substrate 50 and rear glass substrate 60 by a pressure in the range of 53,200 Pa (400 Torr) to 79,800 Pa (600 Torr).

In the foregoing constitution, the discharge gas is discharged between the electrodes so that ultraviolet rays are generated, and the ultraviolet rays are irradiated on the phosphoric layers 66. As a result, a color image can be displayed. High-distortion-point glass formed in the thickness of approximately 2.8 mm by means of the floating process is used as front glass substrate 50 and rear glass substrate 60 of PDP 40. A height of barrier rib 61 is 150 µm. Therefore, the PDP cut by means of the PDP cutting method according to the present invention has a thickness of approximately 7 mm at maximum.

A method of manufacturing front glass substrate 50 is described. As glass plate 51, high-distortion-point glass formed from a glass material having the thickness of approximately 2.8 mm that can endure a heat-treatment step included in steps, where bus electrodes 53, black stripes 54, dielectric layer 55 and the like are formed, is used. After a film is formed on glass plate 51 from a material such as ITO or $SnO_2$ by means of the sputtering process, transparent electrodes 52 are formed by means of the photolithographic process. Further, electrodes 53 on transparent electrodes 52 are coated with a photosensitive material including a conductive material such as Ag, and then, patterned and formed.

Next, black stripes 54 are formed from a black insulating material such as a black pigment or RuO. Then, dielectric layer 55 is formed from a $PbO$—$B_2O_3$—$SiO_2$-based glass material. Examples of a method of forming dielectric layer 55 include a screen printing method and a die coating method. Next, MgO is formed by means of the sputtering process or the like, and dielectric protective layer 56 is formed. As a result, the front glass substrate 50 is completed.

Next, a method of forming rear glass substrate 60 is described. Address electrodes 64 are formed from a photosensitive material including a conductive material such as Ag on glass plate 63 of the substantially same specification as that of glass plate 51 of front glass substrate 50. Next, ground dielectric layer 65 is formed from a PbO—$B_2O_3$—$SiO_2$-based glass material. Then, barrier ribs 61 are formed from an aggregate such as $Al_2O_3$ and a glass frit material. Examples of a method of forming barrier ribs 61 include various methods such as a sand blasting process and a photolithographic process. Next, phosphoric pastes in red, green and blue colors are applied to between barrier ribs 61 by means of the printing process, dispenser process, line-jet process or the like so that phosphoric layers 66 are formed. As a result, the rear glass substrate 60 is completed.

After that, front glass substrate 50 and rear glass substrate 60 are overlapped with each other and sealed at the peripheral parts thereof with sealing member 41 so that discharging space 67 is formed therebetween. The gas in discharging space 67 is discharged via exhaust pipe 62, and the mixed gas including neon and xenon is sealed thereinto by the pressure of approximately 66.5 kPa. Then, the assembling of PDP 40 which displays the color image is completed.

The present invention provides the cutting method and the cutting apparatus for dissembling the PDP in order to recycle and reuse glass plate 51 of front glass substrate 50 and glass plate 63 of rear glass substrate 60 and also to ensure waste disposal when PDP whose life has been deteriorated after the product is used, PDP having a poor product quality or the like are disposed. In particular, according to the present invention which provides the cutting method and cutting apparatus capable of simultaneously cutting the two thick glass plates whose peripheral parts are bonded to each other with the predetermined interval therebetween, wherein the recycling of the glass plates and the disposal of the wastes can be assured, PDP which is environment-friendly can be realized. Preferred embodiments of the present invention are described hereinafter referring to the drawings.

First Preferred Embodiment

Figure 1B:
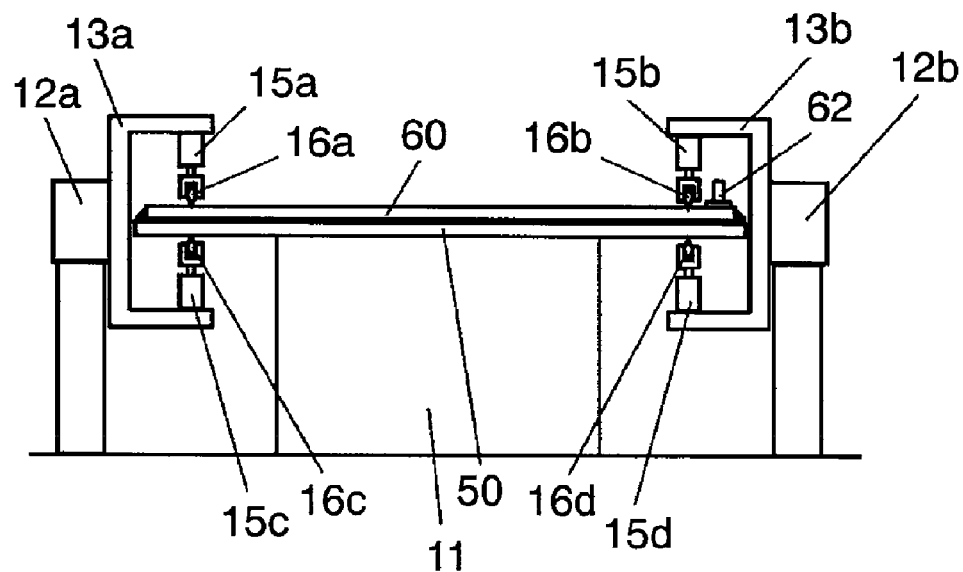
FIG. 1B is a front view illustrating the PDP cutting apparatus according to the first preferred embodiment.

FIG. 1A is a plan view illustrating a PDP cutting apparatus according to a first preferred embodiment of the present invention. FIG. 1B is a front view illustrating the PDP cutting apparatus according to the first preferred embodiment.

In FIGS. 1A and 1B, the PDP cutting apparatus is constituted as follows.

The PDP cutting apparatus includes glass cutting members 16a, 16b, 16c and 16d provided so as to sandwich front glass substrate 50 and rear glass substrate 60 of PDP 40, glass cutting member pressing devices 16a, 15b, 15c and 15d for pressing glass cutting members 16a, 16b, 16c and 16d to front glass substrate 50 and rear glass substrate 60 so that they contact the substrates, and glass cutting member running devices 12a and 12b for running glass cutting members 16a, 16b, 16c and 16d along front glass substrate 50 and rear glass substrate 60.

Front glass substrate 50 is fixedly adsorbed by a vacuum hole (not shown) provided on an upper surface of table 11 which is a substrate table. Glass cutting member retaining sections 13a and 13b are attached to sliders 12a and 12b, which are the glass cutting member running devices, and air-pressure cylinders 15a, 15b, 15c and 15d, which are the glass cutting member pressing devices, are provided at edges of glass cutting member retaining sections 13a and 13b.

Rotating cutters 16a, 16b, 16c and 16d, which are pairs of glass cutting members respectively provided so as to sandwich front glass substrate 50 and rear glass substrate 60, are attached to edges of air-pressure cylinders 15a, 15b, 15c and 15d.

Rotating cutters 16a and 16b are pressed onto rear glass substrate 60 by air-pressure cylinders 15a and 15b with a constant pressure. Rotating cutter 16c and 16d each making a pair with rotating cutters 16a and 16b are pressed onto front glass substrate 50 by air-pressure cylinders 15c and 15d with a constant pressure. More specifically, scribing scares can be formed by rotating cutters 16a, 16b, 16c and 16d on a line substantially flush with front glass substrate 50 and rear glass substrate 60.

Figure 2:
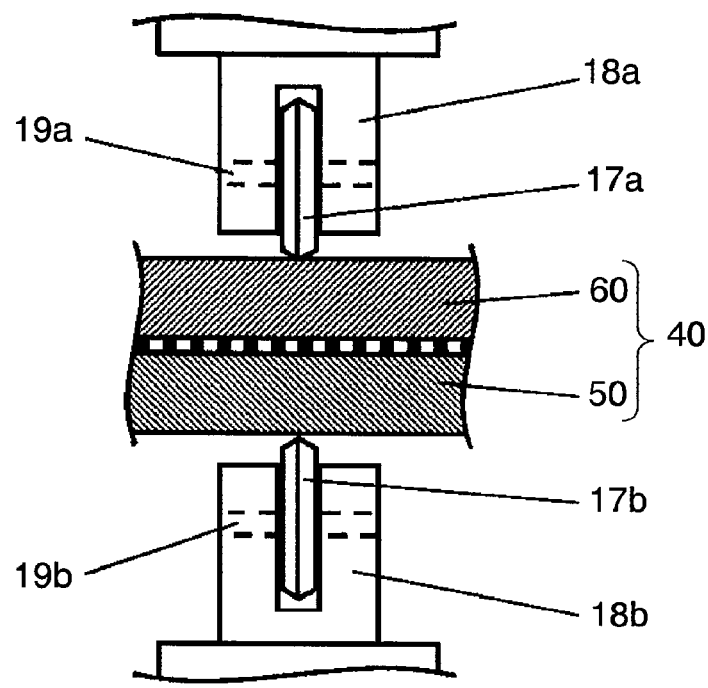
FIG. 2 is a view showing details of rotating cutters according to the first preferred embodiment.

FIG. 2 is a view showing details of the rotating cutters according to the first preferred embodiment. In FIG. 2, cutting blades 17a and 17b are pivotally supported so as to freely rotate by supporting members 19a and 19b provided in cutting blade retaining sections 18a and 18b. In the first preferred embodiment, cutting blades 17a and 17b respectively have the outer diameter of 4 mm, the inner diameter of 1.6 mm, the thickness of 1 mm, and the edge angle 160 degrees. Rotating cutters 16a, 16b, 16c and 16d are formed from super-hard alloy, and supporting members 19a and 19b are also formed from super-hard alloy. A clearance of approximately 0.03 mm is provided between supporting members 19a and 19b and the inner diameters of cutting blades 17a and 17b, and a lubricating agent whose main constituent is molybdenum is applied inside the clearance in order to improve rotatability and abrasion resistance.

The cutting apparatus thus constituted fixedly adsorbs PDP 40 to table 11, and runs sliders 12a and 12b while pressing rotating cutters 16a, 16b, 16c and 16d onto front glass substrate 50 and rear glass substrate 60, so that the scribing scars are formed in front glass substrate 50 and rear glass substrate 60.

In the first preferred embodiment, rotating cutters 16a, 16b, 16c and 16d are run by sliders 12a and 12b. Alternatively, PDP 40 may be moved with rotating cutters 16a, 16b, 16c and 16d being stationary.

A step of cutting PDP 40 is described in detail hereinafter. Air-pressure cylinders 15a, 15b, 15c and 15d press the respective pairs of rotating cutters 16a and 16c, and 16b and 16d which can freely rotate to front glass substrate 50 and rear glass substrate 60 with the pressing force of approximately 8 kgW In this state, sliders 12a and 12b are run to one ends of front glass substrate 50 and rear glass substrate 60 to the other ends thereof at the speed of 300 mm/sec.

The scribing is performed while rotating cutters 16a, 16b, 16c and 16d are pressed with the constant pressure in such a manner that both sides of front glass substrate 50 and rear glass substrate 60 are thereby sandwiched. Accordingly, the scribing scars formed by rotating cutters 16a, 16b, 16c and 16d consequently generate cracks reaching rear surfaces of the respective glass substrates. As a result, front glass substrate 50 and rear glass substrate 60 can be easily cut. Thus, the region including sealing member 41 at the ends of PDP 40 in a latitudinal direction can be cut off along lines 22 and 23.

Next, table 11 is rotated through 90 degrees, the region including sealing member 41 at the edges of front glass substrate 50 and rear glass substrate 60 in a longitudinal direction can be cut off along lines 20 and 21 in a similar manner. Any unnecessary peripheral part of front glass substrate 50 and rear glass substrate 60 is thus removed, and glass-substrate central parts 40b, from which the glass plate can be recycled, can be taken out.

As described above, in the first preferred embodiment, rotating cutters 16a, 16b, 16c and 16d are run by sliders 12a and 12b from the one ends of front glass substrate 50 and rear glass substrate 60 to the other ends thereof, so that the peripheral parts of front glass substrate 50 and rear glass substrate 60 are cut off.

Glass-substrate central parts 40b thus taken out are separated into front glass substrate 50 and rear glass substrate 60. Then, the electrodes, dielectrics, barrier ribs, phosphors and the like respectively formed on front glass substrate 50 and rear glass substrate 60 are removed therefrom. Thus, glass plates 51 and 63 shown in FIG. 9 can be recycled. The region including sealing members 41 which is cut off is processed as the wastes.

In the first preferred embodiment, the running speeds of sliders 12a and 12b are set to 300 mm/sec, and the pressing forces of air-pressure cylinders 15a, 15b, 15c and 15d are set to approximately 8 kgW. However, the cutting process can achieve a high precision and a high efficiency when the running speeds of sliders 12a and 12b are at most 500 mm/sec, and the pressing forces of air-pressure cylinders 15a, 15b, 15c and 15d are between 4 kgW and 10 kgW. When the pressing forces of air-pressure cylinders 15a, 15b, 15c and 15d are below 4 kgW, the substrates are merely scratched and not cut, which is called "scribe state".

In the two glass substrates bonded to each other, the glass-substrate end parts, the glass-substrate sealed parts, and the glass-substrate central parts respectively have different structures. Therefore, in the case where the pressing forces and the running speeds of the pair of rotating cutters are arranged to be equal in the respective parts of the glass substrates, depths of the extended cracks may be irregular, or the cracks may be generated in different directions. Under such circumstances, conditions of the pressing forces and the running speeds of the rotating cutters are changed in the respective parts of the glass substrates so that the cutting process can be reliable.

Below is described in detail a cutting method wherein the conditions of the pressing forces and the running speeds of the rotating cutters are changed.

Figure 3:
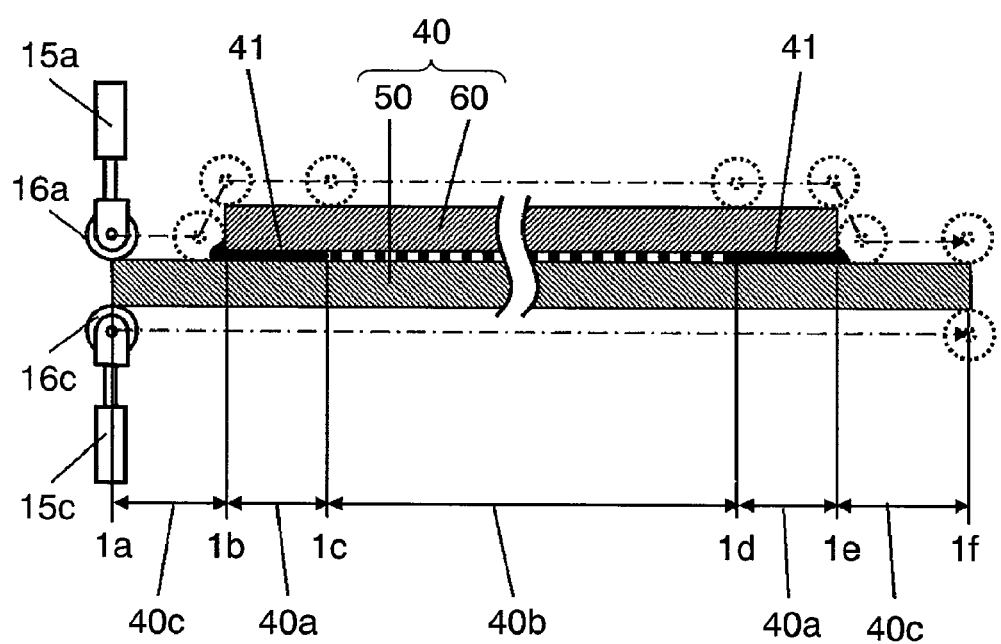
FIG. 3 is a sectional view illustrating a cut part of the PDP according to the first preferred embodiment.

FIG. 3 is a sectional view illustrating a cut part of the PDP according to the first preferred embodiment. The first preferred embodiment 1 shows an example of the cutting process in the longitudinal direction (along 8B-8B line) shown in FIG. 8A.

In FIG. 3, PDP 40 includes glass-substrate end part 40c from position 1a to position 1b where front glass substrate 50 and rear glass substrate 60 are not overlapped with each other, glass-substrate sealed parts 40a from position 1b to position 1c where the sealing member is adhered, glass-substrate central parts 40b from position 1c to position 1d where the sealing member is not adhered, glass-substrate sealed parts 40a from position 1d to position 1e where the sealing member is adhered, and glass-substrate end part 40c from position 1e to position 1f where front glass substrate 50 and rear glass substrate 60 are not overlapped with each other.

At position 1a where the cutting of PDP 40 starts, the pressing forces are applied to the pair of rotating cutters 16a and 16c by air-pressure cylinders 15a and 15c, and positions of upper rotating cutter 16a and lower rotating cutter 16c are decided so that front glass substrate 50 is thereby sandwiched. At the time, the cutting process can favorably achieve a high precision when a misalignment amount of the positions to which rotating cutters 16a and 16c abut is at most 0.2 mm.

PDP 40 is run from cutting starting position 1a to cutting ending position 1f while the predetermined pressing forces are being applied to PDP 40 by the pair of rotating cutters 16a and 16c. The cracks are thereby generated in front glass substrate 50 and rear glass substrate 60 so that PDP 40 is cut.

In glass-substrate end part 40c from position 1a to position 1b, the crack is generated only in glass substrate 50 by rotating cutters 16a and 16c from the both surfaces of front glass substrate 50 so that glass substrate 50 is cut. In this manner, the crack which is straight across the entire thickness of front glass substrate 50 can be generated with the pressing forces which are relatively weak or the running speeds which are relatively high. More specifically, rotating cutters 16a and 16c are run with the pressing force of 3.5 kgW and at the running speed of 100 mm/sec so that the crack is generated across the entire thickness of front glass substrate 50 so that it can be cut.

In glass-substrate sealed parts 40a from position 1b to position 1c, the cutting position of upper rotating cutter 16a is moved to the upper surface of rear glass substrate 60 and run without any movement of the cutting position of lower rotating cutter 16c. In the relevant region, front glass substrate 50 and rear glass substrate 60 adhered to each other with sealing member 41 are simultaneously cut. Therefore, the pressing force which is relatively strong or the running speed which is relatively low is necessary in order to generate the cracks reaching the rear surfaces of the respective glass substrates. More specifically, rotating cutters 16a and 16c are run with the pressing force of 9 kgW and at the running speed of 30 mm/sec so that the cracks extending from the blade edges of rotating cutters 16a and 16c are connected to each other inside PDP 40. As a result, PDP 40 can be cut.

In glass-substrate central parts 40b from position 1c to position 1d, front glass substrate 50 and rear glass substrate 60 are simultaneously cut. In the absence of sealing member 41, however, the cracks reaching the rear surfaces of the substrates can be generated with the pressing forces weaker or at the running speed lower than those in glass-substrate sealed parts 40a from position 1b to position 1c. More specifically, upper rotating cutter 16a and lower rotating cutter 16c are run with the pressing force of 8 kgW and at the running speed of 300 mm/sec so that the cracks reaching the rear surfaces of front glass substrate 50 and rear glass substrate 60 are generated so that they can be cut.

In glass-substrate sealed parts 40a from position 1d to position 1e, the substrates can be cut under the same conditions as those in glass-substrate sealed parts 40a from position 1b to position 1c.

In glass-substrate end part 40c from position 1e to position 1f, the substrates can be cut under the same conditions as those in glass-substrate sealed part 40c from position 1a to position 1b. Thus, PDP 40 can be cut in a straight line in the longitudinal direction (along 8B-8B line in FIG. 8A) when rotating cutters 16a and 16c are run once.

As described, the pressing forces of the pair of rotating cutters 16a and 16c in glass-substrate sealed parts 40a are increased in comparison to those in glass-substrate central parts 40b and glass-substrate end parts 40c. Further, the running speeds in glass-substrate sealed parts 40a are reduced in comparison to those in glass-substrate central parts 40b and glass-substrate end parts 40c. In this manner, the cracks can be reliably extended straight through to the rear surfaces of the respective glass substrates in any of these parts, and PDP 40 can be thereby efficiently cut. Then, washing and sludge treatments become unnecessary because the substrate can be cut by means of the dry process, and facility costs can be thereby largely reduced.

After PDP 40 is cut straight along 8B-8B line shown in FIG. 8A, PDP 40 is rotated in a plane of the table and cut straight along 8C-8C line shown in FIG. 8A. Thus, four sides of PDP 40 are cut. As a result, glass-substrate sealed parts 40a which are not recyclable and glass-substrate central parts 40b which are recyclable can be easily cut and separated from each other. When rotating cutters 16a and 16c are run at the time, these cutters press the inner-side parts relative to glass-substrate sealed parts 40a of PDP 40 along 8B-8B line and 8C-8C line shown in FIG. 8A. As a result, glass-substrate sealed parts 40a which are not recyclable and glass-substrate central parts 40b which are recyclable can be easily separated from each other.

When the pressing forces and the running speeds of rotating cutters 16a and 16c are simultaneously changed in compliance with the respective states of the glass substrates as described in the first preferred embodiment, the optimal cutting conditions can be easily set. Further, the cutting process can achieve a high precision when the running speeds are maintained at a constant level, and only the pressing forces are controlled in such a manner that the pressing forces in at least glass-substrate sealed parts 40a are increased in comparison to those in glass-substrate central parts 40b and glass-substrate end parts 40c. Further, the cutting process can also achieve a high precision when the pressing forces are maintained at a constant level, and only the running speeds are controlled in such a manner that the running speeds in at least glass-substrate sealed parts 40a are lowered in comparison to those in glass-substrate central parts 40b and glass-substrate end parts 40c. In these cases, the cutting apparatus can be more easily controlled.

Recyclable glass-substrate central parts 40b which have been thus segregated are divided into the part of front glass substrate 50 and the part of rear glass substrate 60 and recycled after the electrodes, dielectrics, barrier ribs, phosphors and the like respectively formed thereon are removed. Glass-substrate sealed parts 40a which cannot be recycled are processed as the wastes.

In the first preferred embodiment, cutting blades 17a and 17b are pivotally supported so as to freely rotate by supporting members 19a and 19b provided in cutting blade retaining sections 18a and 18b and rotated by a frictional force between cutting blades 17a and 17b and the glass substrates so that glass cutting members 16a, 16b, 16c and 16d can be more durable. Alternatively, cutting blades 17a and 17b may be forcibly rotated in order to control the cutting force.

Further, the edge angles of cutting blades 17a and 17b are set to 160 degrees in the first preferred embodiment. The cutting process can attain a high efficiency when the edge angles are set to between 145 and 165 degrees. Further, the outer diameters of cutting blades 17a and 17b are set 4 mm, the inner diameters thereof are set to 1.6 mm, and the thicknesses thereof are set to 1 mm in the first preferred embodiment. However, these diameters may be appropriately set depending on use conditions, installing conditions and the like of rotating cutters 16.

As is clear from the first preferred embodiment, the PDP cutting method according to the present invention is the PDP cutting method wherein the front glass substrate and the rear glass substrate are overlapped with each other and sealed with the sealing member. When the method is adopted, the front glass substrate and the rear glass substrate are sandwiched by the pair of glass cutting members, and the PDP is cut in such a manner that the pair of glass cutting members presses the front and rear glass substrates when they run thereon.

According to the method, the PDP including the two glass substrates can be efficiently cut, and the washing and sludge treatments become unnecessary because the substrates can be cut by means of the dry process. As a result, the facility costs can be largely reduced.

Further, one of the pressing forces and the running speeds of the glass cutting members are different respectively in the glass-substrate sealed parts where the sealing member is formed, the glass-substrate central parts where the front glass substrate and the rear glass substrate are overlapped with each other with the interval therebetween, and the glass-substrate end parts where only one of the front glass substrate and the rear glass substrate is present.

According to the method, the PDP including the two bonded glass substrates can be efficiently cut, and the washing and sludge treatments become unnecessary because the substrates can be cut by means of the dry process. As a result, the facility costs can be largely reduced.

Further, the pressing forces of the glass cutting members in the glass-substrate sealed parts are desirably larger than those of the glass cutting members in the glass-substrate central parts and the glass-substrate end parts. According to the method, the cracks can be reliably extended through to the rear surfaces of the glass substrates even in the glass-substrate sealed parts and the other glass-substrate parts. As a result, the glass substrates can be cut securely.

Further, the running speeds of the glass cutting members in the glass-substrate sealed parts are desirably lower than those of the glass cutting members in the glass-substrate central parts and the glass-substrate end parts. According to the method, the cracks can be reliably extended through to the rear surfaces of the glass substrates in all of the parts of the glass substrates. As a result, the glass substrates can be cut securely.

Further, the glass cutting members are desirably the rotating cutters, wherein the durability of the glass cutting members can be increased in the cutting process.

Further, the rotating direction of the rotating cutters in contact with the front glass substrate and the rotating direction of the rotating cutters in contact with the rear glass substrate are desirably reverse to each other, wherein the glass substrates can be easily cut when the pairs of rotating cutters are run.

Second Preferred Embodiment

A second preferred embodiment of the present invention is different to the first preferred embodiment as follows. In the first preferred embodiment shown in FIG. 1A, rotating cutters 16a, 16b, 16c and 16d are fun from the one ends of front glass substrate 50 and rear glass substrate 60 to the other ends thereof by sliders 12a and 12b so that the peripheral parts of front glass substrate 50 and rear glass substrate 60 are cut off.

In the second preferred embodiment, the traveling positions of rotating cutters 16a, 16b, 16c and 16d by sliders 12a and 12b in the latitudinal direction of the glass substrates stay in the range of lines 20 to 21 and do not fall on the both ends of the glass substrates. Next, table 11 is rotated through 90 degrees, the traveling positions of rotating cutters 16a, 16b, 16c and 16d by sliders 12a and 12b in the longitudinal direction of the glass substrates stay in the range of lines 22 to 23. Accordingly, glass-substrate central parts 40b of front glass substrate 50 and rear glass substrate 60 are cut in the rectangular shape, and the peripheral parts thereof are cut in the frame shape.

In the foregoing description, the substrates are cut straight with the provided two sliders, however, the substrates can be cut not only in the straight shape but also in a curved shape so that a contour shape can be obtained.

Figure 4:
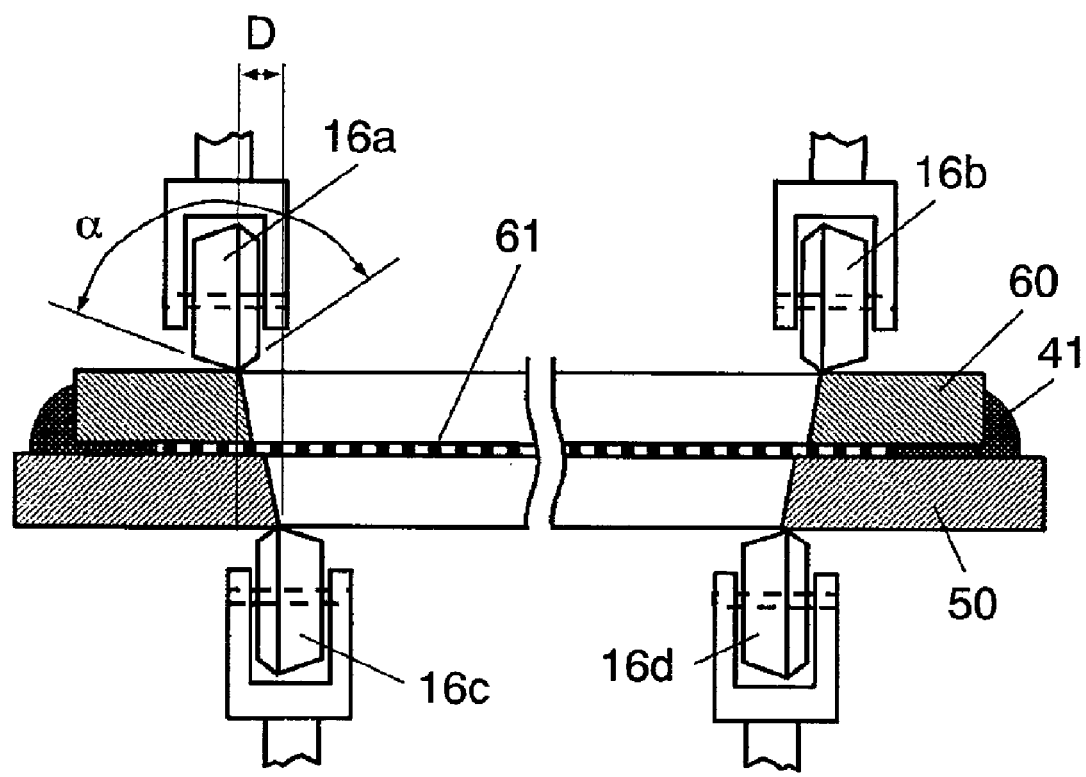
FIG. 4 is a view showing details of a cutting position according to a second preferred embodiment of the present invention.

FIG. 4 is a view showing details of cutting positions in the second preferred embodiment. As shown in FIG. 4, rotating cutters 16a, 16b, 16c and 16d respectively have a blade-edge angle α, and the angle is set to 157 degrees in the second preferred embodiment.

In the second preferred embodiment, as shown in FIG. 4, rotating cutters 16a and 16c vertically making a pair are provided so that the position of rotating cutter 16a pressed onto the upper substrate is on an outer side of the substrates in comparison to the position of rotating cutter 16c pressed onto the lower substrate. In a similar manner, rotating cutters 16b and 16d vertically making a pair are provided so that the position of rotating cutter 16b pressed onto the upper substrate is on an outer side of the substrates in comparison to the position of rotating cutter 16d pressed onto the lower substrate. In the second preferred embodiment, the gap between the two positions is called an offset distance D and set to 0.65 mm.

When the offset distance D is set, the outer peripheral parts in the frame shape including sealing member 41 in the cut-off outer peripheral parts can be dropped downward, which makes the cutting process easier. The outer peripheral parts in the frame shape and glass-substrate central parts 40b can be thus easily separated from each other, which increases a working efficiency.

As is clear from the second embodiment, the front glass substrate and the rear glass substrate are placed on the substrate table so that one of them serves as the upper surface, and the positions of the glass cutting members pressed onto the upper substrate are desirably on the outer peripheral side of the substrates in comparison to the positions of the glass cutting members pressed onto the lower substrate. According to the method, when the downward cutting force is secondarily applied to the region including the sealing member in the outer peripheral parts, the cutting process can be facilitated. Further, the region including the sealing member in the cut-off outer peripheral parts can be dropped downward, which facilitates the cutting process.

Third Preferred Embodiment

In the first and second preferred embodiments, rotating cutters 16a, 16b, 16c and 16d are pressed onto front glass substrate 50 and rear glass substrate 60 when they are run thereon, and the cracks reaching the rear surfaces of the substrates are thereby formed so that the substrates are cut.

In a third preferred embodiment of the present invention, a method, in which the cracks do not reach the rear surfaces, and a pressure of fluid injected from an exhaust pipe is used to cut the scribed section, is described.

Figure 5A:
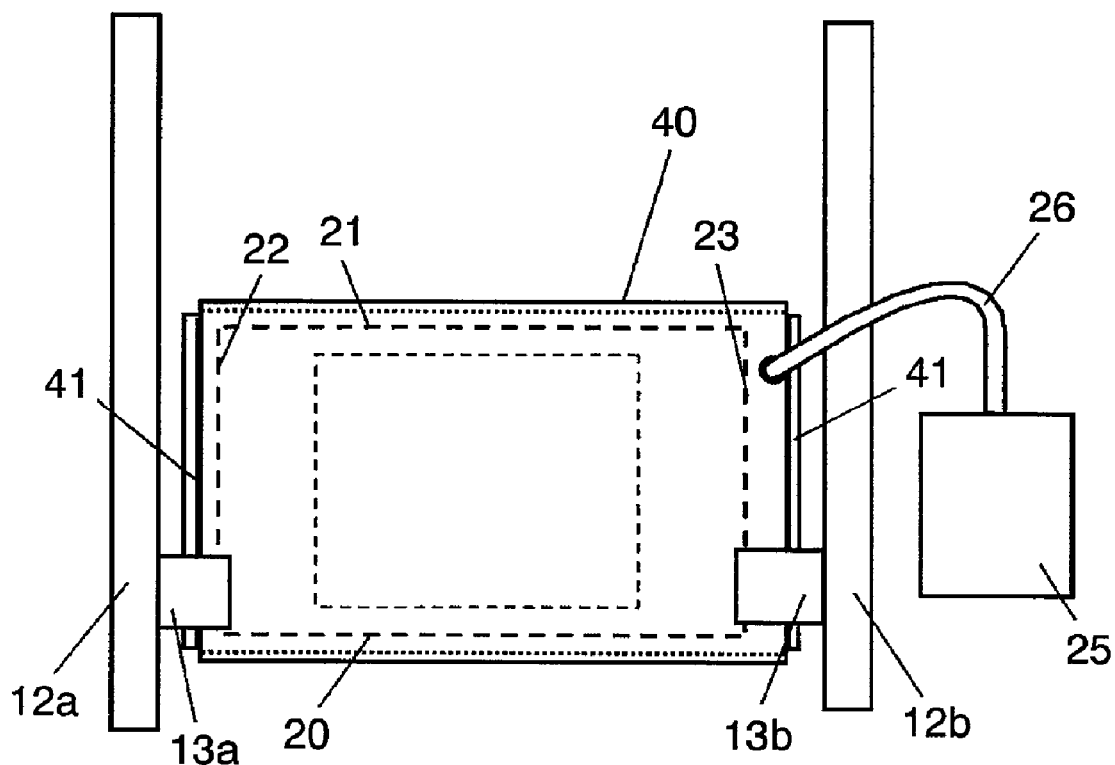
FIG. 5A is a plan view illustrating a PDP cutting apparatus according to a third preferred embodiment of the present invention.
Figure 5B:
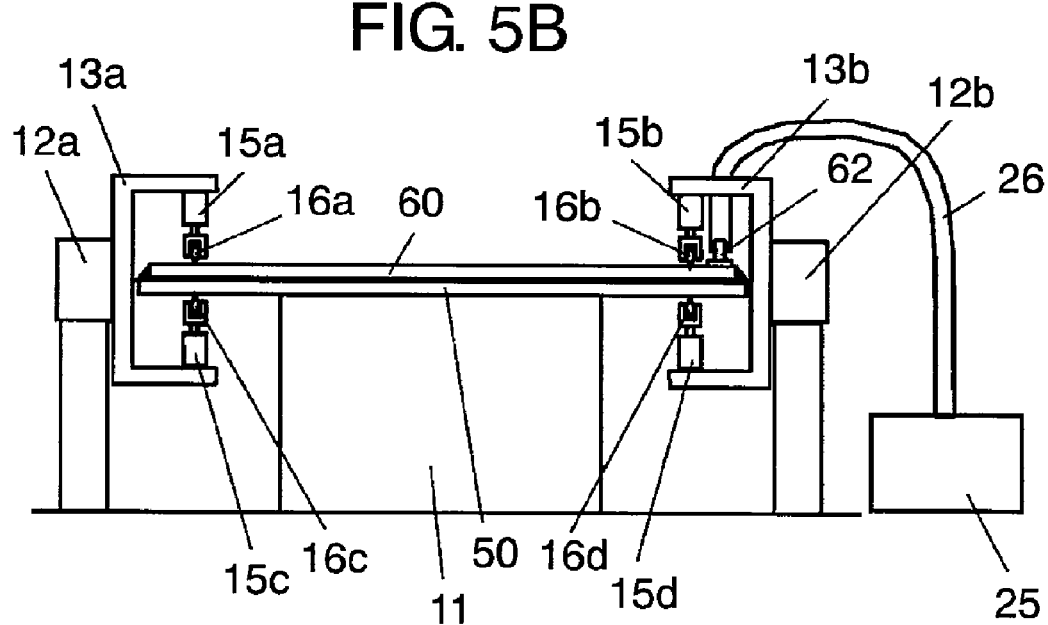
FIG. 5B is a front view illustrating the PDP cutting apparatus according to the third preferred embodiment.

FIG. 5A is a plan view illustrating a PDP cutting apparatus according to the third preferred embodiment. FIG. 5B is a front view illustrating the PDP cutting apparatus according to the third preferred embodiment.

The cutting apparatus shown in FIGS. 5A and 5B is different to the apparatus shown in FIGS. 1A and 1B in that tube 26 serving as a fluid injecting pipe and connected to air-pressure pump 25 serving as a fluid injecting device is connected to exhaust pipe 62 provided at a corner of rear glass substrate 60 of PDP 40.

A cutting step according to the third preferred embodiment is described referring to FIGS. 6A-6C and 7A-7B.

Figure 6A:
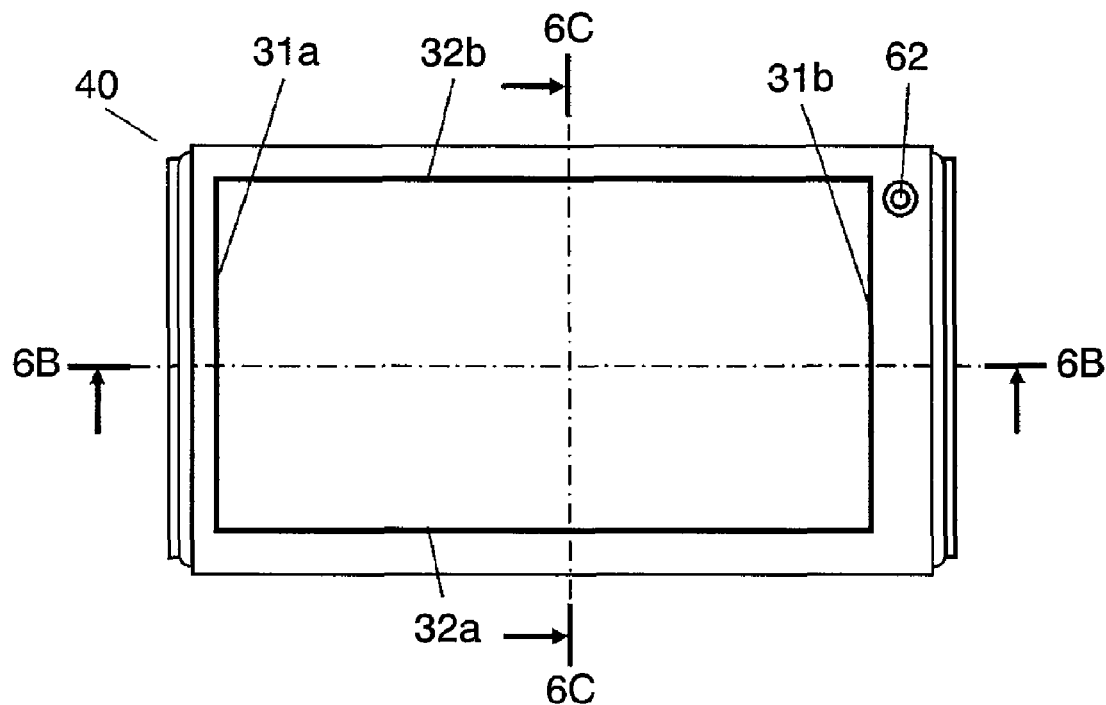
FIG. 6A is a plan view for describing a PDP cutting method according to the third preferred embodiment.
Figure 6B:
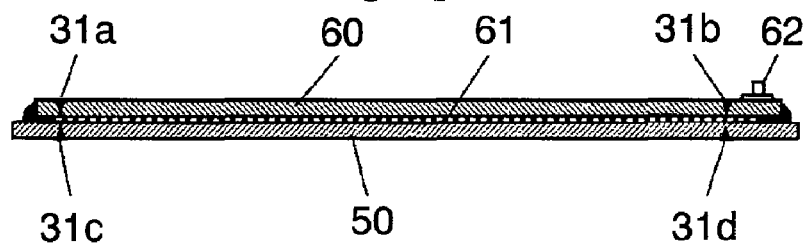
FIG. 6B is a sectional view cut along 6B-6B line shown in FIG. 6A.
Figure 6C:
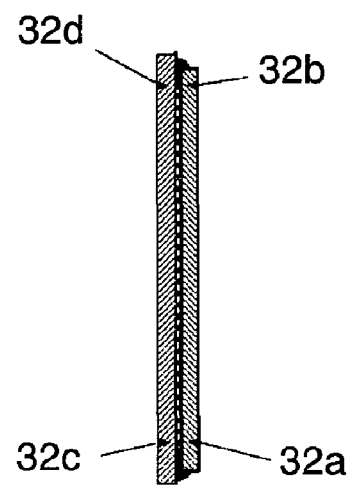
FIG. 6C is a sectional view cut along 6C-6C line shown in FIG. 6A.

FIG. 6A is a plan view for describing a PDP cutting method according to the third preferred embodiment. FIG. 6B is a sectional view cut along 6B-6B line shown in FIG. 6A. FIG. 6C is a sectional view cut along 6C-6C line shown in FIG. 6A. In FIGS. 6A-6C, the outer peripheral parts of front glass substrate 50 and rear glass substrate 60 are scribed with rotating cutters 16a, 16b, 16c and 16d. In the third preferred embodiment, conditions in the scribing are adjusted so that the cracks do not reach the rear surfaces of the respective substrates.

More specifically, as the scribing conditions, the pressing forces of rotating cutters 16a, 16b, 16c and 16d are set to 3 kgW, and the scribing speeds thereof are set to 200 mm/sec. The generated cracks do not reach the rear surfaces when the pressing forces of rotating cutters 16a, 16b, 16c and 16d are below 4 kgW. When the pressing forces and the scribing speeds are thus adjusted, scribing scars, 31a, 31b, 31c, 31d, 32a, 32b, 32c and 32d, which do not reach the rear surfaces of the glass substrates, can be formed.

These scribing scars, 31a, 31b, 31c, 31d, 32a, 32b, 32c and 32d, are formed in the square shape of PDP 40 except for the both edges thereof in the example shown in the drawing. The scribing scars may be generated in a contour shape with corners thereof in a round shape.

Figure 7A:
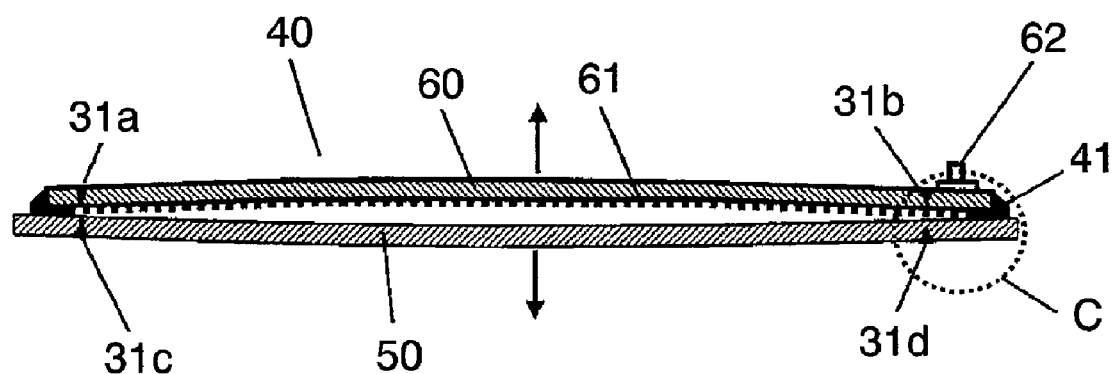
FIG. 7A is a sectional view illustrating a PDP cutting method after scribes shown in FIG. 6A are applied.
Figure 7B:
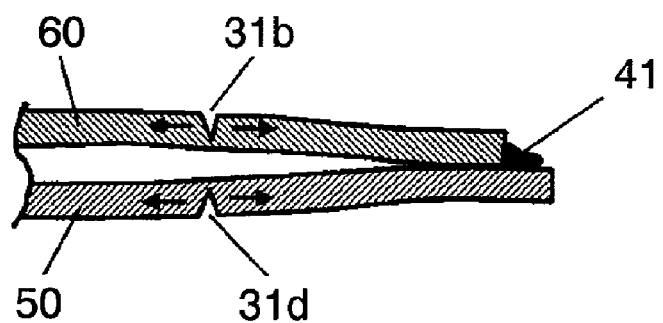
FIG. 7B is an enlarged view of part C shown in FIG. 7A.

FIG. 7A is a sectional view illustrating a PDP cutting method after the scribing shown in FIG. 6A is applied. FIG. 7B is an enlarged view of part C in FIG. 7A.

In FIG. 7A, pressurized air is injected into PDP 40 from exhaust pipe 62 by air-pressure pump 25. A pressure in the injection is 0.5 kgf/cm$^2$. Accordingly, front glass substrate 50 and rear glass substrate 60 are expanded as shown in FIG. 7A, and front glass substrate 50 and rear glass substrate 60 are separated from barrier ribs 61.

Further, as shown in FIG. 7B, a tensile force is applied to scribing scars 31b and 31d by the injection of the pressurized air into PDP 40, which makes the cracks generated by scribing scars 31b and 31d instantly penetrate through to the rear surfaces of the substrates. As a result, the substrates are cut. Thus, the central parts to be recycled can be easily separated with the outer peripheral parts being left in the frame shape.

In the third preferred embodiment, the offset distance can be provided to facilitate the cutting process as described in the second preferred embodiment.

As described, the PDP cutting method and apparatus according to the present invention capable of performing the cutting process of the dry type in the simplified structure can save costs for the cutting process.

As described above, it is desirable that the exhaust pipe is provided in at least one of the front glass substrate and the rear glass substrate, and the fluid is introduced from the exhaust pipe after the scribing scars are formed by the glass cutting members in order to pressurize the space formed by the front glass substrate and the rear glass substrate. According to the method wherein the space is secondarily pressurized, the substrates are cut along the scribing scars, and the front glass substrate and the rear glass substrate can be easily separated from each other.

As is clear from the third preferred embodiment, it is desirable that the exhaust pipe is provided in at least one of the front glass substrate and the rear glass substrate, and the fluid injecting device for introducing the fluid is connected to the exhaust pipe. As a result, the front glass substrate and the rear glass substrate can be easily separated from each other.

As thus far described, according to the present invention, the PDP can be efficiently cut, and the washing and sludge treatments become unnecessary because the substrates can be cut by means of the dry process. As a result, facility costs can be reduced, and the recycling costs can be largely reduced.

INDUSTRIAL APPLICABILITY

A PDP cutting method and apparatus provided by the present invention, wherein the PDP including the two glass substrates can be efficiently cut, is effectively applied, not only to a cutting process for PDP, but also to a cutting process for a liquid crystal display apparatus, or the like, in which glass substrates are used.

The invention claimed is:

1. A method of cutting a plasma display panel including a front glass substrate and a rear glass substrate overlapped with each other and sealed with a sealing member, the method comprising:

sandwiching the front glass substrate and the rear glass substrate between a pair of glass cutting members, and cutting the front glass substrate and the rear glass substrate in such a manner that the pair of glass cutting members is pressed and run with respect to the front glass substrate and the rear glass substrate, wherein at least one of pressing force and running speed of the glass cutting member is different respectively in a glass-substrate sealed part where the sealing member is formed, a glass-substrate central part where the front glass substrate and the rear glass substrate are overlapped with each other with an interval therebetween, and a glass-substrate end part where only one of the front glass substrate and the rear glass substrate is present.

2. The method of cutting the plasma display panel as claimed in claim 1, wherein the pressing force of the glass cutting member in the glass-substrate sealed part is larger than the pressing force of the glass cutting member in the glass-substrate central part and the glass-substrate end part.

3. The method of cutting the plasma display panel as claimed in claim 1, wherein the running speed of the glass cutting member in the glass-substrate sealed part is lower than the running speed of the glass cutting member in the glass-substrate central part and the glass-substrate end part.

4. The method of cutting the plasma display panel as claimed in claim 2, wherein the running speed of the glass cutting member in the glass-substrate sealed part is lower than the running speed of the glass cutting member in the glass-substrate central part and the glass-substrate end part.

5. The method of cutting the plasma display panel as claimed in claim 1, wherein the glass cutting member is a rotating cutter.

6. The method of cutting the plasma display panel as claimed in claim 5, wherein a rotating direction of the rotating cutter in contact with the front glass substrate and a rotating direction of the rotating cutter in contact with the rear glass substrate are reverse to each other.

7. The method of cutting the plasma display panel as claimed in claim 1, wherein an exhaust pipe is provided in at least one of the front glass substrate and the rear glass substrate, and fluid is introduced from the exhaust pipe after a scribing scar is formed by the glass cutting member in order to pressurize a space formed by the front glass substrate and the rear glass substrate.

* * * * *